Patented Apr. 3, 1951

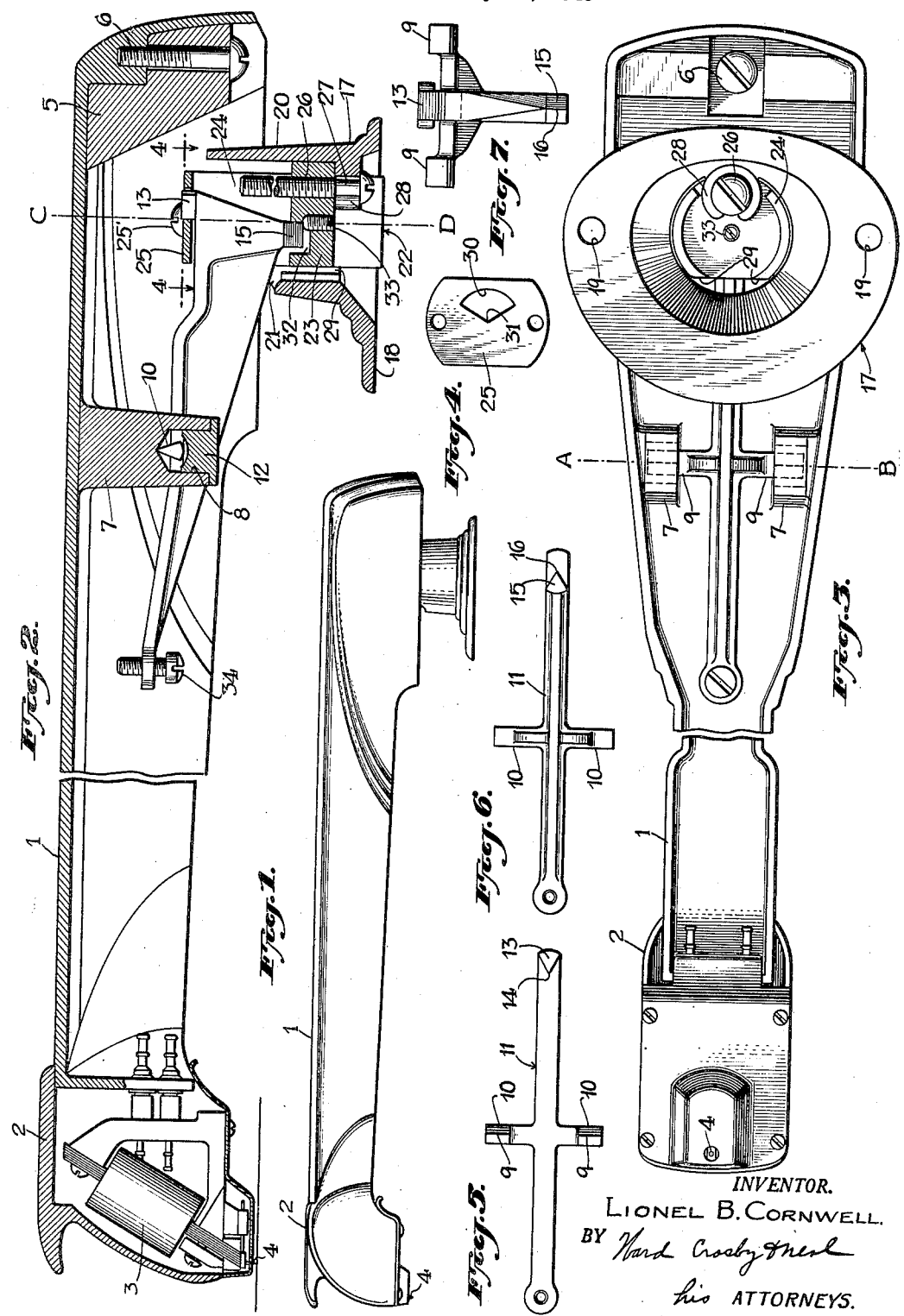

2,547,441

UNITED STATES PATENT OFFICE 2,547,441

TONE ARM

Lionel B. Cornwell, New Canaan, Conn.

Application July 24, 1946, Serial No. 685,931

7 Claims. (Cl. 274—23)

This invention relates to tone arms for phonographs and the like apparatus; and more particularly to tone arms comprising improved means for supporting a pickup or sound translating unit for vertical and horizontal movement.

In devices of this kind a pickup or sound translating unit provided with a stylus or the like translating element is carried by the outer end of the tone arm and it is necessary not only to provide for a predetermined constant force to be exerted by the stylus point against the sound record by suitably balancing the tone arm but to provide for lateral and vertical movement of the stylus point in such a manner as to reduce friction to a minimum. In present practice it is found desirable to have a relatively unbalanced weight such that the force of gravity exerted by the stylus against a sound record is relatively small, e. g., of the order of 35 grams, and hence requirements for reducing friction to a minimum and precision of movement have become quite critical.

Heretofore various attempts have been made to meet these requirements, but the only success attained has been directly proportionate to the degree of precision machining and precise inspection of bearing parts with a correspondingly high or excessive cost.

An object of the invention is to provide a tone arm of the character described having improved pivotal bearings.

Another object of the invention is to provide a device of the character described which may be economically and readily made and yet is efficient and dependable in operation.

Other and further objects and advantages of the invention will be apparent from the following description taken in connection with the accompanying drawings, in which:

Fig. 1 is a side elevation of a tone arm embodying my invention, on somewhat reduced scale;

Fig. 2 is a longitudinal sectional view taken along a vertical plane passing substantially through the longitudinal central axis of Fig. 1;

Fig. 3 is a bottom plan view of the device shown in Fig. 2;

Fig. 4 is a cross-sectional view taken at 4—4 of Fig. 2; and

Figs. 5, 6 and 7 are respectively, a top plan view, a bottom plan view and an end elevational view of the fulcrum arm shown in Figs. 2 and 3.

Referring to the drawings and more particularly to Figs. 1 and 2, an arm 1, preferably of inverted V-shape in cross-section, carries at its forward or outer end an enlarged piston or housing 2 for receiving a suitable sound translating unit or pickup such as 3 provided with a stylus 4. The other end of the arm 1 is preferably provided with a suitable counter-weight such as 5 which is conveniently made separately and secured in place as by a screw 6. The rear end of the arm 1 is preferably widened out (Fig. 3) and in this widened portion, intermediate the head 2 and counter-weight 5, and preferably nearer the latter, a pair of laterally spaced downwardly extending bosses such as 7 are disposed equidistant opposite sides of the central longitudinal axis of the arm 2. The bosses 7 are provided with recesses such as 8 which terminate inwardly in wide inverted V-shaped bottoms whose vertexes provide line bearings lying on a horizontally disposed line A—B (Fig. 3) normal to the said axis of arm 1. The arm 1 is supported for vertical movement, about A—B as an axis; on a pair of fulcrum knife-edges such as 9 (Fig. 5) formed on fulcrum lugs such as 10 which are integral with and extend in opposite directions from the center line of a fulcrum bracket or arm designated in general as 11; the knife-edges 9 being seated in supporting engagement with respective of said line bearings disposed on line A—B. Plugs such as 12, preferably made of resilient material such as rubber, are secured in the recesses 8 with their inner ends spaced downwardly from the bottoms of the fulcrum lugs 10; so as to be free of engagement with said lugs during pivotal movement about the fulcrum axis while preventing accidental lifting of the arm 1 from its fulcrum support.

The fulcrum arm 11 is provided at its rear end with an upper fulcrum lug 13 having a forwardly facing vertically disposed fulcrum knife-edge 14 and with a lower fulcrum lug 15 having a rearwardly facing vertically disposed fulcrum knife-edge 16 in alignment with and spaced downwardly from the knife-edge 14; said edges 14—16 being disposed on a vertical axis C—D in a plane passing through the longitudinal axis or center line of bracket 11 and normal to the line A—B.

The fulcrum arm 11 is supported for movement about the vertical axis C—D in the following manner. A supporting pedestal or base, designated in general as 17, is provided with a bottom flange 18 provided with holes 19 for receiving hold-down screws and with an upwardly extending sleeve portion 20 slotted at 21 to receive and permit free lateral movement of the arm 11. A plug or piston, designated in general as 22, is provided with a cross-head or lower wall 23 and a pair of oppositely disposed upwardly and downwardly extending side walls 24 preferably formed as cylindrical sectors, to the upper ends of which a plate 25 is rigidly secured, as by screws 25', providing an upper end wall. The plug 22 is positioned within a cylindrical bore provided in the sleeve 20 of pedestal 17; said bore being centered on axis C—D and providing a snug sliding fit for plug 22. The plug 22 is held in vertical adjusted position by means of a screw 26 whose upper end is in threaded engagement with the plug and whose lower end is provided with a smooth shank 27 of reduced diameter disposed intermediate its head and threaded portion and journaled for rotation and fixed against axial thrust in a boss 28 (Fig. 3) integral with and extending interiorly of the sleeve 20. The plug wall sections 24 are spaced apart at their forward edges to provide a space in register with the sleeve slot 21 for similarly accommodating the fulcrum arm 11 and the forward edges are in abutting engagement with a pair of vertically extending interior shoulders 29 formed in the sleeve 20 and serving to accurately fix the angular position of the plug 22 while permitting axial adjustment. The wall sections 24 are likewise spaced apart at their rear edges and the bearing lug 28 extends into this space below the end wall 23.

The upper end wall is provided with a recess or opening 30 (Fig. 4) of butterfly shape terminating forwardly in a line bearing 31 disposed on the vertical axis C—D and in supporting engagement with the upper fulcrum edge 14 of lug 13 (Figs. 2 and 5). Similarly, the bottom wall 23 of plug 22 is provided with a butterfly recess 32 (Fig. 2) of the same shape as the recess 30 but diametrically oppositely disposed and providing a line bearing similar to 31 but oppositely disposed on the axis C—D and in supporting engagement with the fulcrum edge 16 on lug 15. The recesses 30 and 32 providing sufficient clearance for a movement of the order of 45° of arm 11 about its vertical fulcrum axis C—D. The vertical component of supporting thrust for the arm 11 is provided by a convex surface of relatively small radius of curvature extending upwardly into the recess 32 on the axis C—D as a center line, and in supporting engagement with the lower end of the fulcrum edge 16 of lower lug 15. This convex surface is conveniently provided by a screw 33 extending upwardly through a cooperating threaded hole centered on axis C—D and the upper end of said screw having a hardened ball point extending into the recess 32 in supporting engagement with the fulcrum edge of lug 15. Alternately, the screw 33 may be provided with a concave or cup-shaped inner end providing a spherical recess in which is journaled a hardened ball whose upper surface is in supporting contact with the fulcrum edge of said lug 15.

Horizontal movement of the fulcrum arm 11 and the tone arm member 1 carried thereby, is limited to the maximum angular movement about the vertical fulcrum axis C—D by the inner edges of the side walls 24 of plug 22 (Figs. 2 and 3). Vertical movement of the tone arm member 1 is limited to the maximum angular movement about the horizontal fulcrum axis A—B in an upward direction by engagement of the inner lower end of weight 5 with the sleeve 20 of the supporting pedestal 17 and in a downward direction by the engagement of the upper end of a screw 34 (Figs. 2 and 3), carried on a forwardly extending end of arm 11, with the adjacent portion of the interior upper wall of tone arm member 1.

It will be seen from the foregoing that I have provided for substantially frictionless movement of the tone arm in both vertical and horizontal directions by a rugged structure which does not require precision machining, nor special inspection or testing with precision gauges; and hence a highly satisfactory device may be produced in desired quantities at relatively low cost.

As will be obvious to those skilled in the art the several parts of the tone arm assembly can be made either by casting or stamping without the necessity of machining operations except for the boring and tapping of the screw holes in the piston or plug 22, and yet for all practical purposes the pivotal axes are frictionless and the parts so disposed as to permit perfect, quiet movement.

Having thus described my invention with particularity with reference to a preferred embodiment thereof, and having referred to certain modifications, it will be obvious to those skilled in the art, after understanding my invention, that other changes and modifications may be made therein without departing from the spirit and scope of the invention, and I aim in the appended claims to cover such changes and modifications as are within the scope of the invention.

What I claim is:

1. A tone arm for sound reproducing and recording comprising a movable arm member and a relatively fixed supporting member, one of said members being provided with a pair of vertically spaced fulcrum lugs and the other of said members being provided with correspondingly cooperating fulcrum notches, said lugs providing oppositely facing knife edges disposed in substantial vertical alignment and said notches providing oppositely disposed vertexes in substantial vertical alignment with and respectively engaged by said knife edges, said lugs and notches being so constructed and arranged that upon angular movement of said arm the sole points of contact between said arm and supporting member lie substantially along a vertical line.

2. A tone arm for sound reproducing and recording comprising a movable arm member and a relatively fixed supporting member, one of said members being provided with a pair of vertically spaced fulcrum lugs and the other of said members being provided with correspondingly cooperating fulcrum notches, said lugs providing oppositely facing knife edges disposed in substantial vertical alignment and said notches providing oppositely disposed vertexes in substantial vertical alignment with and respectively engaged by said knife edges, said supporting member providing a substantially rounded surface of relatively small radius of curvature disposed directly below the lowermost of said vertexes and in vertical supporting engagement with the lowermost of said knife edges, said parts being so constructed and arranged that upon angular movement of said arm the sole points of contact between said arm and supporting member lie substantially along a vertical line.

3. In a device of the character described having a tone arm adapted to carry a pick up head and a member on which said arm is mounted for vertical movement about a substantially horizontal axis, the combination with said member of a second member supporting said first member for horizontal movement about a substantially vertical fulcrum axis spaced rearwardly of said horizontal axis and disposed in a plane substantially normal to and intersecting said horizontal fulcrum, said vertical fulcrum axis being provided by oppositely directed fulcrum edges carried by one of such members and knife edge bearings carried by the other of said members.

4. A tone arm assembly for sound reproducing and recording comprising an arm adapted to carry a sound translating element at one end, a bracket on which said arm is mounted and a support for said bracket, said bracket being provided at its rear end with a pair of vertically spaced fulcrum lugs presenting respective upper forwardly facing and lower rearwardly facing fulcrum knife edges disposed in vertical alignment, said support being provided with notches having vertexes disposed in vertical alignment with and respectively engaged by said knife edges, said notches and lugs being so constructed and arranged that upon angular horizontal movement of said bracket the sole points of contact between said bracket and support lie substantially along a vertical line, said arm being freely pivotally mounted on said bracket about a substantially horizontal axis spaced forwardly of said vertical fulcrum axis.

5. In a tone arm device for sound reproducing and recording having an arm for carrying a sound translating unit and an arm supporting said first arm for vertical movement about a horizontal axis normal to the longitudinal axis of said first arm, the combination with said supporting arm of a relatively fixed support on which said supporting arm is mounted for horizontal movement about a substantially vertical fulcrum axis, said vertical fulcrum axis being provided by vertically spaced knife edge fulcrums disposed in vertical alignment and facing in opposite directions and engaging respective cooperatively associated vertexes, a base, and means for vertically adjusting said support with respect to said base along an axis substantially parallel to said vertical fulcrum axis, said support being fixed against angular movement about said parallel axis.

6. In a device of the character described the combination of an arm for carrying a sound translating unit, a fulcrum arm for supporting said first arm, said fulcrum arm being provided with oppositely disposed lugs providing horizontally spaced fulcrum knife edges and said first arm having cooperatingly disposed recesses provided with vertexes engaged respectively by said knife edges, plugs secured in respective of said recesses with their inner ends spaced below said lugs, said fulcrum arm also having a pair of vertically spaced lugs provided with oppositely disposed knife edge fulcrums disposed in vertical alignment, and a support for said fulcrum arm, said support comprising a base having a vertically disposed sleeve portion, a plug cooperatingly disposed within said sleeve for vertical movement relative thereto and fixed against angular movement, means for securing said plug in adjusted vertical position, said plug being provided with vertically spaced upper and lower end walls having recesses therein providing vertexes cooperatingly disposed to receive respective of said vertically disposed knife edge fulcrums, the lower wall of said plug being provided with a convex bearing surface of relatively small radius of curvature disposed in its recess in vertical alignment with said vertexes and in supporting engagement with the lowermost of said knife edge fulcrums.

7. In a device of the character described the combination of an arm for carrying a sound translating unit, a fulcrum arm for supporting said first arm, said fulcrum arm being provided intermediate its longitudinal extent with oppositely disposed lugs providing horizontally spaced fulcrum knife edges and said first arm having cooperatingly disposed recesses provided with vertexes engaged respectively by said knife edges, resilient plugs secured in respective of said recesses with their inner ends spaced below said lugs, said fulcrum arm also having at its rear end a pair of vertically spaced lugs provided with oppositely disposed knife edge fulcrums disposed in vertical alignment in a plane substantially coinciding with the longitudinal axis of said fulcrum arm, and a support for said fulcrum arm, said support comprising a base having a vertically disposed sleeve portion, a plug cooperatingly disposed within said sleeve for vertical movement relative thereto and fixed against angular movement, means for securing said plug in adjusted vertical position, said plug comprising vertically extending side portions spaced apart on opposite sides of said fulcrum arm and vertically spaced upper and lower end walls having recesses therein providing cooperatingly disposed vertexes in which are seated respective of said vertically disposed knife edge fulcrums, and a ball pointed screw extending axially through said lower wall and having its ball point disposed in said lower wall recess and in vertically supporting engagement with the lowermost of said vertical fulcrum lugs.

LIONEL B. CORNWELL.

REFERENCES CITED

The following references are of record in the file of this patent:

UNITED STATES PATENTS

| Number | Name | Date |
|---|---|---|
| 922,297 | Landon | May 18, 1909 |
| 1,198,636 | Huseby | Sept. 19, 1916 |
| 2,375,658 | Johnson | May 8, 1945 |
| 2,434,033 | Cain | Jan. 6, 1948 |

FOREIGN PATENTS

| Number | Country | Date |
|---|---|---|
| 64,045 | Denmark | Oct. 22, 1945 |